Sept. 15, 1953  M. W. WILSON  2,652,353
ADHESION OF RUBBER TO FIBER
Filed Aug. 27, 1948
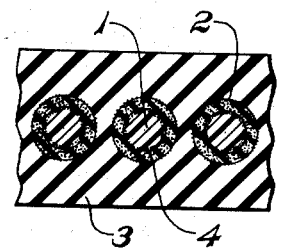
Inventor
Matthew W. Wilson
By Denleigh S. Mauhews
Atty Patented Sept. 15, 1953

2,652,353

UNITED STATES PATENT OFFICE 2,652,353

ADHESION OF RUBBER TO FIBER

Matthew W. Wilson, Cuyahoga Falls, Ohio, assignor to The B. F. Goodrich Company, New York, N. Y., a corporation of New York Application August 27, 1948, Serial No. 46,552

24 Claims. (Cl. 154—136)

This invention relates to the method of adhering synthetic filamentary material to rubbery material and the composite structure obtained thereby, and is particularly concerned with adhering together a rubbery material and a filamentary material comprising a synthetic fiber-forming organic material by means of a heat-hardening adhesive composition comprising a rubber latex and fusible curable acid-catalyzed resin prepared as set forth hereinafter.

Many rubbery articles comprise rubbery material having filamentary material as reinforcement therefor. The filamentary reinforcement is usually incorporated into a body of rubber material, before vulcanization, in the form of textile cord or woven fabric. It is necessary in building a composite article of this kind to provide means for adhering the filamentary material to the rubber material to prevent separation therebetween in service with a resultant premature failure of the article.

Some of the most desirable filamentary materials for reinforcing rubber are the filaments of synthetic fiber-forming organic materials such as nylon, rayon and the polymeric terephthalates. Such filamentary materials have excellent strength and flex resistance but are poorly adherent to rubber, particularly in the case of the polymeric terephthalates. Filamentary materials are commonly bonded to rubber, whether crude or synthetic, by means of an adhesive composition comprising, broadly, a rubber latex and a thermosetting base-catalyzed phenol-aldehyde resin.

The synthetic filaments such as rayon and nylon and particularly the polymeric terephthalate filametns, however, do not adhere satisfactorily to rubber using such an adhesive composition. It is, therefore, an object of this invention to secure improved adhesion of such filamentary materials to rubber material by means of an adhesive composition comprising a rubber latex and a phenol-aldehyde resin.

I have discovered that greatly improved adhesion of the synthetic organic filaments to rubber is obtained when the filaments are coated, prior to incorporation into the rubber, with an adhesive composition comprising an aqueous dispersion of polymeric organic rubber material and a resin prepared by condensing a phenol with an aldehyde in the presence of an acidic catalyst to yield a fusible curable resin having an essentially linear molecular structure. More particularly, the resin employed in practising this invention is the fusible curable resin prepared by condensing one mole of a phenol with 0.7 to 1.0 mole of an aldehyde in the presence of an ionizable acid condensation catalyst.

A composite structure having improved adhesion between the filamentary reinforcement and a body of rubber material is prepared by coating the filamentary material with the adhesive composition embodying this invention, drying the coated filamentary material, incorporating it into a body of vulcanizable rubber material, and thereafter heating the assembled structure to vulcanize the rubbery components and thermoset the resin. As shown in the drawing which is a diagrammatic vertical sectional view of a representative article prepared according to the present invention, the composite structure comprising filament or fiber 1 coated with adhesive 2 is vulcanized in the mass of rubbery material 3. Some of the adhesive will penetrate into the fiber as shown at 4 and may also penetrate into the mass of rubbery material.

The filamentary material employed in practising this invention may be any of those synthetic filaments comprising a synthetic fiber-forming organic material. Thus, the synthetic filaments may include rayon, that is, the regenerated cellulosic materials whether prepared by the viscose, cuprammonium or other process; nylon, by which is meant synthetic linear superpolyamides such as polyhexamethylene adipamide; and similar fiber-forming organic materials. The invention is particularly applicable where the filamentary material comprises a polymeric terephthalate, which class of filaments is normally very poorly adherent to rubbery materials.

The polymeric terephthalates may be prepared by reacting a glycol of the series $HO(CH_2)_nOH$, wherein $n$ is greater than 1, with terephthalic acid according to the method set forth by Whinfield and Dickson in British Patent 578,079. The glycols most commonly employed are those having the formula $HO(CH_2)_nOH$ wherein $n$ is a number from 2 to 10, including such materials as ethylene glycol, trimethylene glycol, and decamethylene glycol. These glycols may be reacted with terephthalic acid itself or with an aliphatic ester of terephthalic acid wherein the aliphatic group contains from 1 to 8 carbon atoms. The filaments prepared from the polymeric terephthalates are known commercially as "Fiber V," "Terelon" and "Terylene."

The rubber material to which the filamentary material is adhered may be any sulfur vulcanizable polymeric organic rubber material, whether crude or synthetic, either crude rubber or the rubbery butadiene copolymers being preferably employed. The crude rubber employed may be any of the naturally occurring rubber materials including, for example, caoutchouc, balata, gutta percha, and the like. Likewise any of the various synthetic rubbers may be used including polymers of butadiene-1,3, isoprene, 2-chlorobutadiene-1,3, isobutylene, and the like, as well as interpolymers of these and similar materials with each other or with such interpolymerizable monomers as styrene, acrylonitrile, methacrylonitrile, methyl methacrylate, methyl acrylate, ethyl methacrylate, 2-vinyl pyridine, and similar monomeric materials. The rubber material may also include mixtures of any of the above materials with each other or with reclaimed crude or synthetic rubber or other sulphur vulcanizable rubber materials. The rubber materials may also include any of the well-known compounding ingredients for rubber in the amounts and proportions in accordance with conventional compounding techniques.

In the adhesive composition used to coat the filamentary material, the resin may be any of the fusible curable condensation resins prepared by condensing substantially equimolar proportions of a phenol with an aldehyde in the presence of an acidic catalyst to yield a resin having an essentially linear molecular structure which is substantially free of cross-linkage. The reason why increased adhesion is obtained between rubber and the synthetic organic filaments and particularly with the terephthalic acid-dihydroxy alcohol condensation polymer filaments when the adhesive composition includes the acid-catalyzed phenolaldehyde resin is not understood and the scope of the invention will not be limited by any theory which might be offered by way of explanation.

The phenol used in preparing the resin may be any of the members of the aromatic hydroxyl series consisting solely of carbon, hydrogen and hydroxyl oxygen, and the term "a phenol" is used in the generic sense to include any of these materials. Thus the phenol may include any of the monohydric phenols such as phenol, cresol, or xylenol and the like but is preferably one of the water-soluble polyhydric phenols having hydroxyl groups in meta relationship such as resorcinol, phloroglucinol, orcinol, cresorcinol and m-xylorcinol, although other monohydric and polyhydric phenols may be used.

The phenol may be condensed with any resin-forming aldehyde, i. e., any aldehyde which will condense therewtih to yield a thermosetting resinous condensation product, and the aldehydes which are free of phenyl groups and consist solely of carbon, hydrogen and aldehyde oxygen are particularly suitable. Such aldehydes may include, for example, such materials as furfural and acrolein, with the aliphatic aldehydes having a saturated chain of less than 6 carbon atoms being desirably employed such as formaldehyde, acetaldehyde and butyraldehyde.

The resin, in order to have an essentially linear molecular structure, must be prepared by condensing 1 mole of a phenol with not more than 1 mole of an aldehyde. Preferably, substantially equimolar proportions of a phenol and an aldehyde are condensed by refluxing a mixture of these components in the presence of an acidic condensation catalyst. Desirably from 0.7 to 1.0 mole of an aldehyde is condensed with 1.0 mole of a phenol. Any of the well-known acidic condensation catalysts may be employed with the ionizable inorganic or organic acids being preferably used. Thus the ionizable mineral acids such as sulfuric acid may be used, although such acids as oxalic acid and the benzene sulfonic acids are preferably employed for use in controlling the condensation reaction. The acid catalyst may be used in varying amounts depending upon the reaction time desired with 0.05% to 5.0% by weight based on the weight of the phenolic constitutents being desirably used.

The condensation reaction is carried out in a water miscible volatile organic solvent since the resinification may be accomplished by refluxing for a very short time, the reaction generally being complete in 15 to 60 minutes of heating under reflux. Any of the water miscible volatile organic solvents may be used which do not readily coagulate latex. The amount of solvent employed may vary widely with the minimum amount being dependent upon the solubility of the resin therein and the maximum amount being determined by its coagulative effect on latex. Generally, the solvent is used in an amount of 30% to 150% by weight based on the combined weight of the phenolic and aldehyde reactants. Of the solvents, acetone is preferably used, although the water miscible alcohols such as ethyl alcohol, methyl alcohol, glycerin and the like; ketones, such as methyl ethyl ketone and the like; and similar well-known water miscible solvents may be used.

The resins prepared in this manner by the acid-catalyzed condensation of substantially equimolar proportions of a phenol with an aldehyde have an essentially linear molecular structure substantially free of cross-linkage. This resin may then be mixed with a rubber latex, but the resin in solution in the solvent is preferably dissolved in an aqueous solution of base before addition to the latex in order to obtain best results in accordance with the teachings of Compton and Wilson in U. S. Patent 2,429,397 issued October 21, 1947.

The base used may be sodium or potassium hydroxide or a primary or secondary amine or the like but preferably is ammonium hydroxide. When an alkali metal hydroxide is used, the maximum amount thereof preferably should not exceed 0.1% of the weight of the final adhesive composition or about 2% by weight based on the weight of the resin, although 1.0 to 5.0% of the weight of the final adhesive composition or greater may be used in some cases. The amount of ammonia or amine used is not critical and may be varied within wide limits. For practical purposes, a 28% by weight aqueous solution of ammonia is used in an amount of 5% to 20% of the total weight of the adhesive composition.

The resin is thereupon mixed with any of the well-known aqueous dispersions of vulcanizable polymeric organic material. Thus any sulfur vulcanizable rubber latex, whether crude or synthetic, may be used including caoutchouc latex, or synthetic latices such as latices prepared by the polymerization of butadiene, isoprene, isobutylene and similar ethylenic monomers or interpolymers of these or similar monomers with each other or with such copolymerizable monomers as styrene, acrylonitrile, methacrylonitrile, methyl methacrylate, ethyl methacrylate, 2-vinyl pyridine, 3-vinyl pyridine, 4,6-dimethyl 2-vinyl pyridine, and similar well-known monomers. Of such latices the rubbery hydrocarbon butadiene copolymeric latices are preferably employed.

The rubber latex may include, in addition to the rubber, any of the well-known compounding ingredients for latex such as vulcanizing agents and accelerators therefor, antioxidants, fillers, reinforcing agents, emulsifiers, stabilizers, modifiers, etc., in amounts and proportions in accordance with conventional compounding techniques.

The amount of latex is chosen so that the resin-to-rubber ratio in the final adhesive composition is from 1:6 to 1:2 parts by weight.

The final adhesive composition may contain from 3% to 40% by weight of rubber solids with a composition containing 8% to 20% by weight of rubber solids being desirably employed. The amount of phenolic resin in the composition may vary widely but, in general, the resin amounts to 0.5% to 20% of the total composition weight and preferably from 0.8% to 10% of the total weight.

The synthetic organic filamentary material may be treated with the adhesive composition, whether in the form of yarn, cord or fabric, by immersing the filamentary material in the adhesive composition, by spraying or spreading the adhesive composition thereon or by any similar well-known method. In the case of tire cord, the cord is preferably immersed in the adhesive composition for a time sufficient to obtain a penetration of the rubber latex into the cord to a depth of 3 to 7 filament diameters. An immersion time of 2 to 4 seconds or less is usually sufficient although in some cases an immersion time of as much as a minute may be used. The immersion may be carried out at room temperature or at temperatures up to 100° C., with a temperature of 85° C. being commonly employed.

After immersion, the excess adhesive is removed from the filamentary material by passing it between squeeze rolls or preferably by subjecting the filamentary material to the action of beater bars which shake the excess adhesive therefrom. The treated filamentary material is thereafter thoroughly dried in air, preferably in an air oven, to remove the moisture therefrom and to harden the coating. The drying operation is preferably carried out at 150° to 300° F. to prevent the possible deleterious effect on the filamentary material, although temperatures as high as 400° F. may be used in some cases. The cord may be dried either in a relaxed condition or under slight tension in accordance with well-known practices.

The treated filamentary material is then incorporated into a rubbery composition by any of the conventional methods for associating filamentary material and rubber material; one of the preferred methods, in the case of cord, fabric and the like, being to calender a thin layer of the rubber on one or both sides of the cord or fabric. The rubber coating protects the adhesive layer and the coated filamentary material may be stored until used without danger of contamination tending to reduce the strength of the adhesive bond. This material is thereafter used for building various rubber articles such as tires, belts, etc., which, after assembly, are vulcanized by means of heat and pressure in accordance with well-known rubber processing techniques.

The improvement in adhesion obtained by use of an adhesive composition in accordance with this invention is best illustrated by means of a few specific examples. It is to be understood that the examples are merely illustrative and it is not intended that the invention be limited thereby.

*Example 1*

A tire is built by treating polymeric ethylene terephthalate tire cord with an adhesive composition prepared in accordance with this invention, calendering a vulcanizable rubber composition on the treated cord to form cord-reinforced plies, assembling the plies and tread, and thereafter vulcanizing the assembly in a mold.

In preparing a preferred adhesive composition, a resorcinol-formaldehyde resin is made by dissolving 59 g. of resorcinol, 40 cc. of formalin (37% by weight formaldehyde), and 0.4 g. of oxalic acid in 70 cc. of acetone. This mixture is refluxed on a steam bath for 30 minutes whereupon a sirupy solution containing about 50% of resin having an essentially linear molecular structure is obtained.

A 7.0 g. portion of this resin solution is dissolved in 5 cc. of ammonium hydroxide (28% by weight of ammonia) and the mixture is diluted with 23 cc. of water. The resulting diluted solution is then mixed with 35 g. of latex (37% rubber solids) prepared by interpolymerization of 65 parts by weight of butadiene-1,3, 10 parts by weight of 2-vinyl pyridine and 25 parts by weight of styrene.

Cord made from polymeric ethylene terephthalate fiber is immersed in this adhesive composition for 5 seconds, the excess adhesive is removed from the cord, the cord is dried, and the dried cord is incorporated into a crude rubber tire carcass composition of conventional formulation. The resulting assembly is vulcanized at 280° F. for 45 minutes and the cord to rubber adhesion is determined by measuring the force necessary to pull a single cord free from the rubber under compression in accordance with the test method as set forth by Lessig and Compton (Rubber Chemistry and Technology, 19, 223, January 1946).

The adhesion value thus obtained is 647 pounds as compared to 449 pounds for an adhesive composition containing a base-catalyzed resin in combination with the same butadiene-1,3 interpolymer latex. Similarly improved results are obtained with rayon or nylon cord using the above adhesive composition.

*Example 2*

The acid-catalyzed resin prepared as in Example 1 may be employed in combination with a 75:25 butadiene-styrene copolymer latex in an adhesive composition consisting of 3.5 parts by weight of acid-catalyzed resorcinol-formaldehyde resin, 3.5 parts by weight of acetone, 5 parts by weight of 28% ammonium hydroxide, and 48 parts by weight of the copolymer latex (29.2% rubber solids).

Polymeric terephthalate cord treated with this adhesive composition and incorporated into rubber has an adhesion value after vulcanization more than 150 pounds higher than the adhesion obtained using the same composition with the acid-catalyzed resin replaced by a base-catalyzed resin.

Similarly improved adhesion is obtained using any adhesive composition including an acid-catalyzed resin of essentially linear molecular structure with other well-known sulfur vulcanizable rubber latices for adhering any of the commercially available synthetic organic filaments to any of the commonly employed vulcanizable rubbery compositions within the spirit and scope of the invention as defined in the appended claims.

I claim:

1. The method of adhering organic fiber to a body of vulcanizable rubbery conjugated diene polymer, which method comprises treating said fiber with an aqueous dispersion comprising 3 to 40% by weight of a rubbery conjugated diene polymer, 0.5 to 20% by weight of a resin prepared by a method consisting essentially of condensing substantially equimolar proportions of a phenol with an aldehyde in the presence of 0.05 to 5%, by weight of said phenol, of an acidic catalyst and from 30 to 150 percent by weight based on the combined weight of the aldehyde and phenolic reactants, of a water-miscible volatile organic solvent, the resin:polymer ratio in said dispersion being from 1:6 to 1:2 by weight, and 0.1 to 5% by weight of a base, drying said treated fiber and assembling said fiber in intimate relation with said body of rubbery polymer, and vulcanizing the body of rubbery polymer in said assembly.

2. The method of adhering organic fiber to a body of vulcanizable rubbery conjugated diene polymer, which method comprises treating said fiber with an aqueous dispersion comprising 3 to 40% by weight of a rubbery conjugated diene polymer, 0.5 to 20% by weight of a resin prepared by a method consisting essentially of condensing one mole of a polyhydric phenol with from 0.7 to 1.0 mole of an aldehyde in the presence of 0.05 to 5%, by weight of said phenol, of an ionizable acid catalyst and from 30 to 150 percent by weight based on the combined weight of the aldehyde and phenolic reactants, of a water-miscible volatile organic solvent, the resin:polymer ratio in said dispersion being from 1:6 to 1:2 by weight, and 1.4 to 5.6% by weight of ammonia, drying said treated fiber and assembling it in intimate relation with said body of rubbery polymer, and vulcanizing said rubbery polymer.

3. The method of adhering organic fiber to a body of vulcanizable rubbery conjugated diene polymer, which method comprises treating said fiber with an aqueous dispersion comprising 3 to 40% by weight of a rubbery conjugated diene polymer, 0.5 to 20% by weight of a resin prepared by a method consisting essentially of condensing one mole of resorcinol with from 0.7 to 1.0 mole of formaldehyde in the presence of 0.05 to 5%, by weight of said resorcinol, of an ionizable acid catalyst and from 30 to 150 percent by weight based on the combined weight of the aldehyde and phenolic reactants, of a water-miscible volatile organic solvent, the resin:polymer ratio in said dispersion being from 1:6 to 1:2 by weight, and 1.4 to 5.6% by weight of ammonia, drying said treated fiber and assembling it in intimate relation with said body of rubbery polymer, and vulcanizing said rubbery polymer.

4. The method of claim 3 in which said fiber consists essentially of the condensation polymer of terephthalic acid and ethylene glycol.

5. The method of claim 3 in which said fiber is rayon fiber.

6. The method of adhering textile cord comprising a plurality of organic fibers to a body of vulcanizable rubbery conjugated diene polymer, which method comprises immersing said cord in an adhesive composition comprising a mixture of an aqueous dispersion of vulcanizable rubbery conjugated diene polymer and vulcanizing agent therefor, a solution in a water-miscible volatile organic solvent of a resin prepared by a method consisting essentially of condensing one mole of resorcinol with 0.7 to 1.0 mole of formaldehyde in the presence of 0.05 to 5%, by weight of said resorcinol, of an ionizable acid catalyst and from 30 to 150 percent by weight based on the combined weight of the aldehyde and phenolic reactants, of a water-miscible volatile organic solvent, and aqueous ammonia, said rubbery polymer being from 8 to 20% by weight of said composition, said resin being from 0.8 to 10% by weight of said composition, and said ammonia being from 1.4 to 5.6% by weight of said composition, the resin:polymer ratio in said composition being from 1:6 to 1:2 by weight, removing said cord from said composition and drying it in heated air at 150° to 300° F., assembling said cord in intimate contact with said body of vulcanizable rubbery polymer, and heating said assembly to vulcanize said rubbery polymer.

7. The method of claim 6 in which said fibers consist essentially of the condensation polymer of terephthalic acid with ethylene glycol.

8. The method of claim 6 in which said fibers are rayon fibers.

9. The method of claim 6 in which the rubbery polymer in said adhesive composition consists essentially of a rubbery copolymer of 2-vinyl pyridine, styrene, and butadiene-1,3.

10. The method of making an adhesive composition which comprises forming a substantially linear resin by a process consisting essentially of condensing substantially equimolar proportions of a phenol with an aldehyde in the presence of 0.05 to 5%, by weight of said phenol, of an acid catalyst and from 30 to 150 percent by weight based on the combined weight of the aldehyde and phenolic reactants, of a water-miscible volatile organic solvent, and mixing said resin with an aqueous dispersion comprising a rubbery conjugated diene polymer and with a base to form a composition containing 3 to 40%, by weight of said composition, of said rubbery polymer, 0.5 to 20% of said resin, and 0.1 to 5% of said base, the resin:polymer ratio being from 1:6 to 1:2 by weight.

11. The method of making an adhesive composition comprising forming a substantially linear resin by a method consisting essentially in condensing one mole of a polyhydric phenol with 0.7 to 1.0 mole of an aldehyde in the presence of 0.05 to 5%, by weight of said phenol, of an ionizable acid catalyst and from 30 to 150 percent by weight based on the combined weight of the aldehyde and phenolic reactants, of a water-miscible volatile organic solvent, and mixing said resin with an aqueous dispersion comprising a rubbery conjugated diene polymer and a vulcanizing agent and with aqueous ammonia to form a composition containing 8 to 20%, by weight of said composition, of said rubbery polymer, 0.8 to 10% of said resin, and 1.4 to 5.6% of ammonia, the resin:polymer ratio in said composition being from 1:6 to 1:2 by weight.

12. The method of making an adhesive composition which comprises forming a resin by a method consisting essentially of condensing one mole of resorcinol with 0.7 to 1.0 mole of formaldehyde in the presence of 0.05 to 5%, by weight of said resorcinol, of an ionizable acid catalyst in from 30 to 150 percent by weight, based on the combined weights of the aldehyde and phenolic reactants, of a water-miscible volatile organic solvent to form a solution of a linear resin in said solvent, and mixing said solution with an aqueous dispersion comprising a rubbery conjugated diene polymer and a vulcanizing agent and with aqueous ammonia to form a composition containing 8 to 20%, by weight of said composition, of said rubbery polymer, 0.8 to 10% of said resin, and 1.4 to 5.6% of ammonia, the resin:polymer ratio in said composition being from 1:6 to 1:2 by weight.

13. The method of adhering synthetic organic fiber to a body of vulcanizable rubbery conjugated diene polymer, which comprises forming a resin by a method consisting essentially of condensing 1.0 mole of a phenol with from 0.7 to 1.0 mole of an aldehyde in the presence of an ionizable acidic catalyst in an amount of from 0.05 to 5.0% by weight based on the weight of said phenol and a water miscible volatile organic solvent in an amount of from 30 to 150% by weight based on the combined weights of said phenol and said aldehyde to form a substantially linear condensation resin, adding to the resin mixture an aqueous solution of base in an amount sufficient to dissolve said resin, incorporating said aqueous basic resin mix with an aqueous dispersion of a vulcanizable rubbery conjugated diene polymer to form an adhesive composition containing from 0.5 to 20% by weight of resin and from 3 to 40% by weight of vulcanizable rubbery conjugated diene polymer as the essential ingredients in a ratio of said resin to said rubber of from 1:6 to 1:2 parts by weight, treating a synthetic organic fiber with said adhesive composition for a period of time sufficient to coat said fiber and to penetrate at least the outer layers of said fiber, removing the excess of said adhesive from said fiber, air drying said adhesive treated fiber to remove moisture therefrom and harden the adhesive coating, combining said adhesive treated fiber with a body of vulcanizable rubbery conjugated diene polymer, forming an assembly containing said adhesive treated fiber and said vulcanizable rubbery conjugated diene polymer, and heating the same to vulcanize said polymer in said body and in said adhesive.

14. An article comprising a body of vulcanized rubbery conjugated diene polymer bonded to a synthetic organic fiber with an intermediate adhesive layer comprising a vulcanized rubbery conjugated diene polymer and a thermoset resin, said adhesive prepared by a method consisting essentially in condensing substantially equimolar proportions of a phenol with an aldehyde in the presence of from 0.05 to 5% by weight, based on said phenol, of an acid catalyst and a water miscible volatile organic solvent in an amount of from 30 to 150% by weight based on the combined weights of said phenol and said aldehyde to form a substantially linear condensation resin, adding an aqueous solution of a base in an amount sufficient to dissolve said resin, incorporating said aqueous basic resin mix with an aqueous dispersion of a vulcanizable rubbery conjugated diene polymer to form an adhesive composition containing from 0.5 to 20% by weight of said resin and from 3 to 40% by weight of said polymer in a ratio therebetween of from 1:6 to 1:2 parts by weight.

15. An article comprising a body of vulcanized rubbery conjugated diene polymer bonded to an organic fiber with an intermediate layer comprising a vulcanized rubbery conjugated diene polymer and a resin prepared by a process consisting essentially of condensing substantially equimolar proportions of a phenol with an aldehyde in the presence of from 0.05 to 5.0% by weight of said phenol, of an acidic catalyst and from 30 to 150 percent by weight, based on the combined weights of the aldehyde and phenolic reactants, of a water miscible volatile organic solvent, the resin:polymer ratio in said layer being from 1:6 to 1:2 by weight.

16. An article comprising a body of vulcanized rubbery conjugated diene polymer bonded to a textile cord comprising a plurality of organic fibers by means of an interposed layer comprising a vulcanized rubbery conjugated diene polymer and a resin prepared by a method consisting essentially of condensing one mole of a polyhydric phenol with from 0.7 to 1.0 mole of an aldehyde in the presence of from 0.05 to 5.0%, by weight of said phenol, of an ionizable acid catalyst and from 30 to 150 percent by weight, based on the combined weights of the aldehyde and phenolic reactants, of a water-miscible volatile organic solvent, the resin:polymer ratio in said layer being from 1:6 to 1:2 by weight.

17. An article comprising a body of vulcanized rubbery conjugated diene polymer bonded to a textile cord comprising a plurality of organic fibers by means of an interposed layer comprising a vulcanized rubbery conjugated diene polymer and a resin prepared by a method consisting essentially of condensing one mole of resorcinol with from 0.7 to 1.0 mole of formaldehyde in the presence of from 0.05 to 5.0%, by weight of said resorcinol, of an ionizable acid catalyst and from 30 to 150 percent by weight, based on the combined weights of the aldehyde and phenolic reactants, of a water miscible volatile organic solvent, the resin:polymer ratio in said layer being from 1:6 to 1:2 by weight.

18. The article of claim 17 in which the cord comprises rayon fibers.

19. The article of claim 17 in which the cord comprises fibers consisting essentially of the condensation polymer of terephthalic acid with ethylene glycol.

20. The article of claim 17 in which the rubbery polymer in said interposed layer consists essentially of a rubbery copolymer of 2-vinyl pyridine, styrene and butadiene-1,3.

21. An adhesive composition comprising an aqueous dispersion containing from 3 to 40% by weight of said composition of a rubbery conjugated diene polymer, from 0.5 to 20% of a resin prepared by a process consisting essentially of condensing substantially equimolar proportions of a phenol with an aldehyde in the presence of from 0.05 to 5.0% by weight of said phenol, of an acidic catalyst, and from 30 to 150 percent by weight, based on the combined weights of the aldehyde and phenolic reactants, of a water-miscible volatile organic solvent, the resin:polymer ratio being from 1:6 to 1:2 by weight and from 0.1 to 5.0% of a base.

22. An adhesive composition comprising an aqueous dispersion containing from 8 to 20%, by weight of said composition, of a rubbery conjugated diene polymer, from 0.8 to 10% of a resin prepared by a process consisting essentially of condensing one mole of a polyhydric phenol with from 0.7 to 1.0 mole of an aldehyde in the presence of from 0.05 to 5.0%, by weight of said phenol, of an acidic catalyst, the resin:polymer ratio being from 1:6 to 1:2 by weight, from 30 to 150 percent by weight, based on the combined weights of the aldehyde and phenolic reactants, of a water-miscible volatile organic solvent, and from 1.4 to 5.6% of ammonia.

23. An adhesive composition according to claim 22 in which the phenol is resorcinol and the aldehyde is formaldehyde.

24. An adhesive composition comprising an aqueous dispersion containing from 8 to 20%, by weight of said composition, of a rubbery copolymer of 2-vinyl pyridine, styrene, and butadiene- 1,3, from 0.8 to 10% of a resin prepared by a process consisting essentially of condensing one mole of resorcinol with from 0.7 to 1.0 mole of formaldehyde in the presence of from 0.05 to 5.0%, by weight of said resorcinol, of an acidic catalyst, and from 30 to 150 percent by weight, based on the combined weights of the aldehyde and phenolic reactants, of a water-miscible volatile organic solvent, the resin:polymer ratio being from 1:6 to 1:2 by weight, and from 1.4 to 5.6% of ammonia.

MATTHEW W. WILSON.

References Cited in the file of this patent

UNITED STATES PATENTS

| Number | Name | Date |
|---|---|---|
| 1,802,390 | Novotny | Apr. 28, 1931 |
| 2,128,635 | Charch et al. | Aug. 30, 1938 |
| 2,425,349 | Schroeder | Aug. 12, 1947 |
| 2,429,397 | Compton et al. | Oct. 21, 1947 |
| 2,449,180 | Schroeder | Sept. 14, 1948 |
| 2,481,879 | Ross | Sept. 13, 1949 |

FOREIGN PATENTS

| Number | Country | Date |
|---|---|---|
| 595,290 | Great Britain | Dec. 1, 1947 |

OTHER REFERENCES

"The Chemistry of Commercial Plastics," by Wakeman, pp. 115–125.

"Formaldehyde," by Walker, Monograph Series No. 98, published in 1944 by Reinhold Publishing Corp., pp. 39–40.